(12) United States Patent
Akiyama et al.

(10) Patent No.: US 6,795,380 B2
(45) Date of Patent: Sep. 21, 2004

(54) OPTICALLY-ASSISTED MAGNETIC RECORDING HEAD AND OPTICALLY-ASSISTED MAGNETIC RECORDING APPARATUS

(75) Inventors: Junichi Akiyama, Kanagawa-ken (JP); Akira Kikitsu, Kanagawa-ken (JP); Tadashi Kai, Kanagawa-ken (JP); Toshihiko Nagase, Kangawa-ken (JP); Tomoyuki Maeda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 183 days.

(21) Appl. No.: 10/108,503

(22) Filed: Mar. 29, 2002

(65) Prior Publication Data

US 2002/0167870 A1 Nov. 14, 2002

(30) Foreign Application Priority Data

Mar. 29, 2001 (JP) ........................................ 2001-095518

(51) Int. Cl.⁷ ............................................. G11B 11/00
(52) U.S. Cl. ................... 369/13.33; 369/13.17
(58) Field of Search ........................... 369/13.02, 13.24, 369/13.32, 13.33, 13.13, 13.17

(56) References Cited

U.S. PATENT DOCUMENTS 5,696,372 A    12/1997  Grober et al.
5,986,978 A *  11/1999  Rottmayer et al. ...... 369/13.17
6,160,768 A *  12/2000  Yanagawa ................ 369/13.32
6,317,280 B1 * 11/2001  Nakajima et al. ............. 360/59
6,438,073 B1 *  8/2002  Shimazaki et al. ...... 369/13.32
6,496,450 B2 * 12/2002  Watanabe ................ 369/13.38
6,498,776 B1 * 12/2002  Nakano et al. ......... 369/112.23
6,618,330 B1 *  9/2003  Kawasaki et al. ....... 369/13.23

FOREIGN PATENT DOCUMENTS

JP         2000-195002        7/2000

OTHER PUBLICATIONS

Robert D. Grober, et al. "Optical Antenna: Towards a Unity Efficiency Near–Field Optical Probe," Appl. Phys. Lett., 70 (11), Mar. 17, 1997, pp. 1354–1356.

* cited by examiner

Primary Examiner—Tan Dinh
Assistant Examiner—Mark Blouin
(74) Attorney, Agent, or Firm—Oblon, Spivak, McClelland, Maier & Neustadt, P.C.

(57) ABSTRACT

A pair of members opposed to each other via a gap are commonly used as an evanescent light probe and a writing magnetic head. When the spacing and width of the gap are smaller than the wavelength λ of injected light, highly intensive evanescent light is generated from the gap position of the opposite surface. Magnetic writing is carried out by applying a recording magnetic field from the pair of members to a medium heated by the evanescent light.

13 Claims, 14 Drawing Sheets

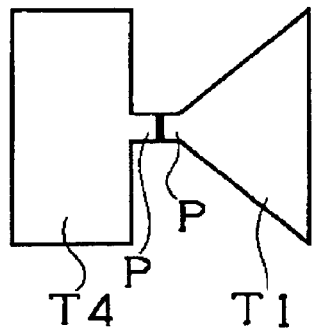
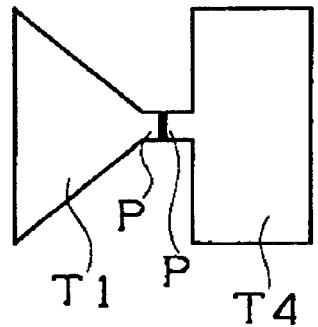
FIG.5E        FIG.5F
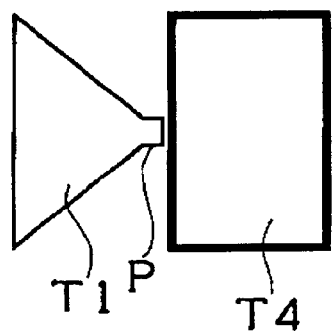
FIG.5G
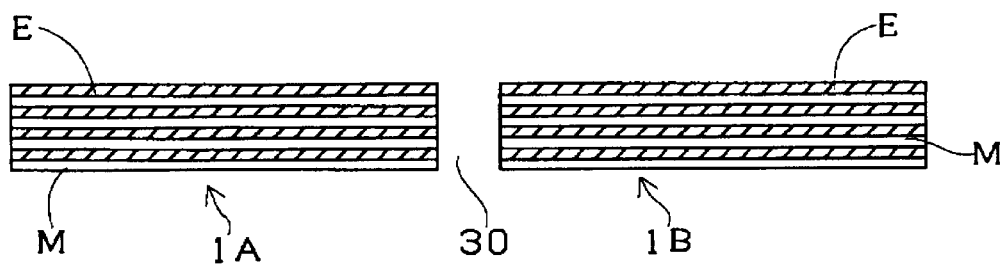
FIG.6

OPTICALLY-ASSISTED MAGNETIC RECORDING HEAD AND OPTICALLY-ASSISTED MAGNETIC RECORDING APPARATUS

CROSS-REFERENCE TO RELATED APPLICATIONS

This application is based upon and claims the benefit of priority from the prior Japanese Patent Application No. 2001-095518, filed on Mar. 29, 2001; the entire contents of which are incorporated herein by reference.

BACKGROUND OF THE INVENTION

The present invention relates to an optically-assisted magnetic recording head and an optically-assisted magnetic recording apparatus, and more particularly, to a novel optically-assisted magnetic recording head and an optically-assisted magnetic recording apparatus, capable of heating a magnetic recording medium by a light irradiation in order to magnetically record data to the medium with an extremely high density.

Magnetic recording apparatus for magnetically recording and reproducing information are under continuous development as large-capacity, high-speed and inexpensive information storage means. Especially, recent hard disc drive (HDD) has shown remarkable improvements. As proved on the product level, its recording density is over 15 Gbpsi (gigabits per square inch), internal data transfer rate is over 100 Mbps (megabits per second) and price is as low as several yens/MB (megabytes). The high recording density of HDD is due to a combination of improvements of a plurality of elements such as signal processing technique, servo control mechanisms, head, medium, HID, etc. Recently, however, it has become apparent that the thermal agitation of the medium disturbs the higher density of HDD.

The high density of magnetic recording can be attained by miniaturizing the recording cell (recording bit) size. However, as miniaturization of the recording cell progresses, the signal magnetic field intensity from the medium is reduced. So, to assure a predetermined signal-to-noise ratio (S/N ratio), it is indispensable to reduce the medium noise. The medium noise is caused mainly by a disordered magnetic transition. The magnitude of the disorder is proportional to a magnetization reversal unit of the medium.

The magnetic medium uses a thin film formed from polycrystalline magnetic particles (referred to as "multiparticle thin film" or "multiparticle medium" herein). In case a magnetic exchange interaction affects between magnetic particles, the magnetization reversal unit of the multiparticle thin film is composed of a plurality of exchange-coupled magnetic particles.

Heretofore, when a medium is to have the recording density of several hundreds Mbpsi to several Gbpsi, for example, noise reduction of the medium has been attained mainly by reducing the exchange interaction between the magnetic particles and making smaller the magnetization reversal unit. In the latest magnetic medium of 10 Gbpsi in recording density, the magnetization reversal unit is of only 2 or 3 magnetic particles. Thus, predictably, the magnetization reversal unit will be reduced to the size of only one magnetic particle in near future.

Therefore, to ensure a predetermined S/N ratio by further reducing the magnetization reversal unit, it is necessary to diminish the size of the magnetic particles. Taking the volume of a magnetic particle as V, a magnetic energy the particle has can be expressed as KuV where Ku is a magnetically anisotropic energy density the particle has. When V is made smaller for a lower medium noise, KuV becomes smaller with a result that the thermal energy near the room temperature will disturb information written in the medium, and reveals the problem of thermal agitation.

According to the analysis made by Sharrock et al., if the ratio between magnetic energy and thermal energy (kT, where $\underline{k}$ is Boltzman's constant and T is absolute temperature) of a particle, KuV/kT, is not 100 or so, it will impair the reliability of the record life. If reduction of the particle size is progressed for a lower medium noise with the anisotropy energy density Ku being maintained at (2 to 3)×$10^6$ erg/cc of the CoCr group alloy conventionally used as a magnetic film in the recording medium, it is getting difficult to ensure a thermal agitation resistance.

Recently, magnetic film materials having a Ku value more than $10^7$ erg/cc, such as CoPt, FePd, etc., have been attracting much attention. However, simply increasing the Ku value for compatibility between the small particle size and thermal agitation resistance will lead to another problem. The problem concerns the recording sensitivity. Specifically, as the Ku value of the magnetic film of a medium is increased, the recording coercive force Hc0 of the medium (Hc0=Ku/Isb; Isb is the net magnetization of the magnetic film of the medium) increases, and the necessary magnetic field for saturation recording increases proportionally to Hc0.

A recording magnetic field developed by a recording head and applied to the medium depends upon a current supplied to a recording coil as well as upon a recording magnetic pole material, magnetic pole shape, spacing, medium type, film thickness, etc. Since the tip of the recording magnetic pole is reduced in size as the recording density is higher, the magnetic field developed by the recording head is limited in intensity.

Even with a combination of a single-pole head that will develop a largest magnetic field and a vertical medium with a soft-magnetic backing, for example, its maximum recording field is only around 10 kOe (Oe: oersted). On the other hand, to ensure a sufficient thermal agitation resistance with a necessary particle size of about 5 nm for a future high-density, low-noise medium, it is necessary to use a magnetic film material having a Ku value of $10^7$ erg/cc or more. In this case, however, since the magnetic field intensity necessary for recording to the medium at a temperature approximate to the room temperature is over 10 kOe, recording to the medium is disabled. Therefore, if the Ku value of the medium is simply increased, there will arise the problem of the recording to the medium being impossible.

As having been described in the foregoing, in the magnetic recording using the conventional multiparticle medium, noise reduction, thermal agitation resistance and higher recording density are in a trade-off relation with each other, which is an essential factor imposing a limit to the recording density.

An optically-assisted magnetic recording system will be able to overcome this problem. The optically-assisted magnetic recording system may be called thermally-assisted magnetic recording system, which may be categorized into the following two constructions. That is, the one construction employs a conventionally used multiparticle medium, the other construction employs a continuous magnetic medium that has been used in a magnetic optical recording system.

Preferably, an optically-assisted magnetic recording system using a multiparticle medium uses magnetic particles as fine as sufficiently reducing noise and uses a recording layer exhibiting a high Ku value near the room temperature in order to ensure a thermal agitation resistance. In a medium having such a large Ku value, since the magnetic field intensity necessary for recording exceeds the intensity of a magnetic field developed by the recording head near a room temperature, recording is not possible. In contrast, in the optically-assisted magnetic recording system, locating a medium heating means such as light beams near the recording magnetic pole and locally heating the recording medium during recording to lower Hc0 of the heated portion of the medium below the magnetic field intensity from the recording head, and recording is effected.

Important points for realizing this basic concept are: recording should be completed by supplying a recording magnetic field during heating or before the heated medium cools down; only a limited area as small as the width of the recording pole should be selectively heated to prevent that adjacent tracks are undesirably heated and adjacent magnetic transition is destructed by thermal agitation.

In a mode using a multiparticle medium, in addition to thermal agitation of adjacent tracks, it is necessary to ensure that magnetic transition created in a track to be recorded does not give influences of thermal agitation to a downstream region which does not yet cool down sufficiently. However, it has the advantage that the recording density is determined by the particle size, and flux reversal speed is remarkably high.

On the other hand, a system using a continuous magnetic film, i.e. amorphous magnetic film, has shortcomings, not involved in multiparticle systems, that the recording density is determined by the thickness of the magnetic domain wall (10–20 nm) and, when accompanied with displacement of the domain wall, the speed of the domain wall displacement (tens of m/sec.) determines the data transfer speed. However, volume V of the magnetic particles can be regarded infinite, the problem of thermal agitation is out of problem. Also the system using a continuous magnetic film is equivalent to the multiparticle system in the respect of adjusting the coercive force of the medium near the room temperature higher than the head magnetic field and adjusting the coercive force of the medium of the heated portion lower than the head magnetic field.

A related art technique trying optically-assisted magnetic recording by using a magneto-optic medium as a continuous magnetic film is disclosed in, for example, Journal of the Magnetics Society of Japan vol. 23, 1999, No. 8, pp-1901–1906, the entire contents of this reference being incorporated herein by reference. Since this related art uses far-field light beams as the heat source for heating a medium and locating a recording pole and the beam source in confrontation with the medium, double-side recording is impossible and an evanescent light cannot be used.

Further, recording bit length is determined by the magnetic head, but since the recording track width is determined by the light spot size, the limit of the track width is restricted by the spot size of the far-field light. That is, even when combining a short-wavelength laser and a high NA lens, the limit of the track width is hundreds of nm, therefore, a higher recording density is hard to realize.

Moreover, since the precise alignment of the light-irradiated position and the recording field applying position is quite difficult in that related art, a higher recording density is hard to realize.

As explained above, the use of a multiparticle medium in an optically-assisted magnetic recording system involves various problems, namely, uncertainty of double-side recording, difficulty of employing an evanescent light, difficulty of realizing a precise alignment of the irradiating position and magnetic field applying position, difficulty of realization of a compact, light and inexpensive optically-assisted magnetic recording head, and particularly in a mode using an evanescent light On the other hand, the use of a continuous magnetic film medium involves the problems: double-side recording being impossible, insufficient recording density due to impossibility of using an evanescent light, the recording density being limited by the misalignment of the light irradiating position and the magnetic field applying position.

SUMMARY OF THE INVENTION

The invention has been made on the basis of recognition of those problems. It is therefore an object of the invention is to provide an optically-assisted magnetic recording head and an optically-assisted magnetic recording apparatus enabling optically-assisted, stable magnetic recording by an ultra-high density by the highly efficient use of an evanescent light based on a novel conception.

To accomplish the object, an optically-assisted magnetic recording head to record information magnetically on a medium according to the embodiment of the invention may comprise:

a pair of magnetic yokes having a gap therebetween, irradiation of light onto the gap generating an evanescent light; and a magnetic field generator applying a magneto-motive force to the yokes to build a recording magnetic field across the gap, the information being recorded by the recording magnetic field on the medium which is heated by irradiation of the evanescent light thereto.

That is, the use of the yokes having a gap as a bowtie type evanescent light probe and simultaneously as a magnetic pole for magnetic writing enables optically-assisted stable magnetic recording of an ultra-high density.

An optically-assisted magnetic recording apparatus to record information magnetically on a medium according to the embodiment of the invention may comprise a pair of magnetic poles having a gap therebetween, a recording magnetic field being formed across the gap, information being recorded by the recording magnetic field on the medium which is heated by irradiation of an evanescent light which is formed by irradiation of a light onto the gap.

Alternatively, an optically-assisted magnetic recording apparatus to record information magnetically on a medium according to the embodiment of the invention may comprise:

an irradiator to irradiate a light;

a magnetic field generator;

a pair of magnetic yokes having a gap therebetween, an evanescent light being generated at the gap by the irradiation of the light by the irradiator onto the gap, and a recording magnetic field being formed across the gap by the magnetic field generator; and a transfer mechanism to move the medium relative to the gap, information being recorded by the recording magnetic field on the medium which is heated by irradiation of the evanescent light thereto while the medium is moved by the transfer mechanism.

The optically-assisted magnetic recording head and the optically-assisted magnetic recording apparatus are configured to supply a light beam and a recording magnetic field from a common side of one surface of a medium.

Then the embodiment of the invention uses a component as both a bowtie type evanescent light probe having a remarkably high efficiency of using medium-heating light and a magnetic recording head.

More specifically, a gap forming the evanescent light probe is commonly used as the magnetic gap of the magnetic recording head. In this manner, the region of the medium to be heated and the region on the medium to be applied with the recording magnetic field can be formed to substantially overlap.

As a result, the embodiment of the invention enables selective heating of a region as small as tens of nanometers impossible to realize with far-field light, and also enables the supply of the recording magnetic field just when Hco of the medium sufficiently decreases.

The embodiment of the invention thus enables high-speed, stable and effective optically-assisted magnetic recording of an ultra-high density.

According to the embodiment of the invention, it is possible to endow a low-noise, multiparticle medium having a very small grain size necessary for high-density recording and reproduction with sufficiently high resistance to thermal agitation around the room temperature, and it is also possible to realize high-speed recording using a practical recording head by reducing the magnetic field required for magnetic reversal of the medium by irradiation of intensive evanescent light at the region for application of the recording magnetic field.

Additionally, since the embodiment of the invention permits that both the region to be heated and the region to be applied with the recording magnetic field are cumulated vertically on the magnetic recording medium such that the high-efficiency evanescent light probe is commonly used as the recording magnetic element, heating of the medium and application of the recording medium to the medium can be carried out at the best timings for the benefit of high-density recording, and it results in ensuring high-efficiency optically-assisted magnetic recording.

Furthermore, according to the embodiment of the invention, it is possible to provide a compact, lightweight and highly reliable optically-assisted magnetic recording head can be provided and thereby realize a high-speed seeking operation and decrease the cost of the head and the drive.

As described above, the embodiment of the invention ensures stable magnetic recording of much higher recording density than those of conventional techniques at a high speed. Thus the industrial advantages of the invention are great and remarkable.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings:

FIGS. 5A through 5G are diagrams showing different shapes the recording element 1 according to an embodiment of the invention can take, which are plan views of their distal end portions, each taken from the medium-facing surface;

FIG. 6 is a cross-sectional view that illustrates configuration of yokes 1A, 1B in form of multi-layered structures;

DETAILED DESCRIPTION OF THE INVENTION

Some embodiments of the invention will now be explained in detail by way of specific examples.

Figure 1:
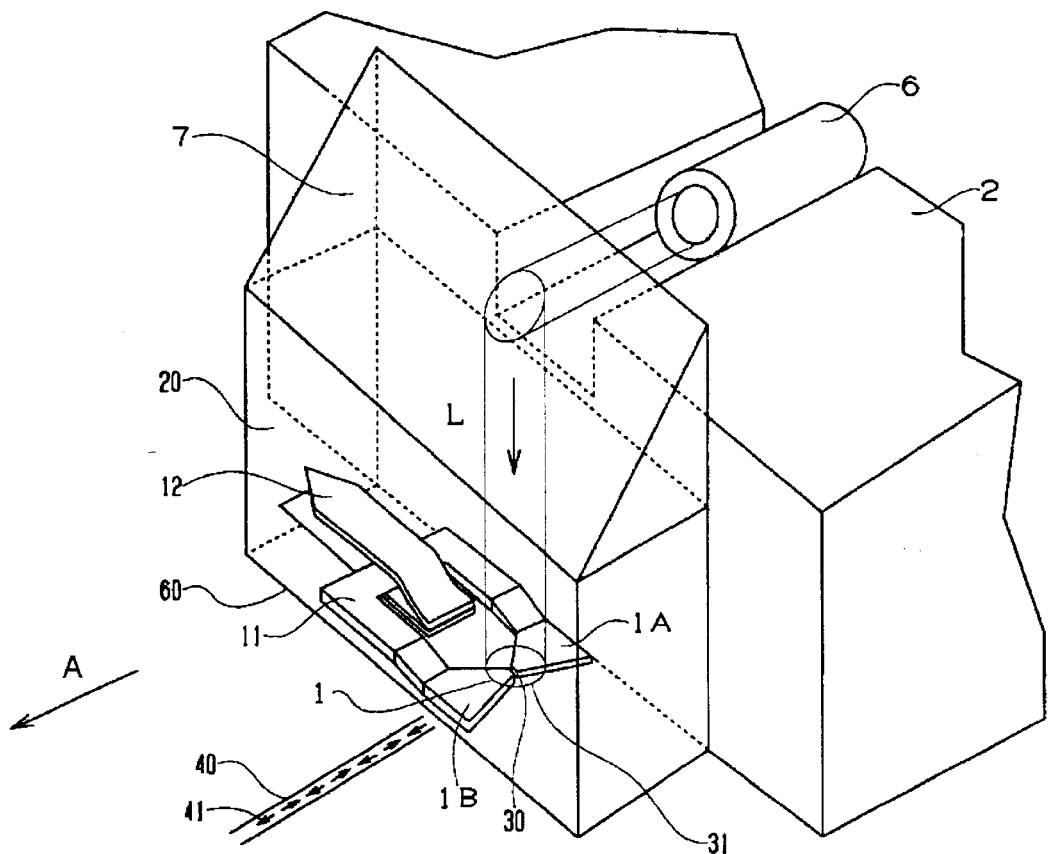
FIG. 1 is a partly transparent perspective view that schematically illustrates configuration of a distal portion of an optically-assisted magnetic recording head according to an embodiment of the invention.

FIG. 1 is a perspective view that schematically illustrates configuration of a distal portion of an optically-assisted magnetic recording head according to an embodiment of the invention.

Figure 2:
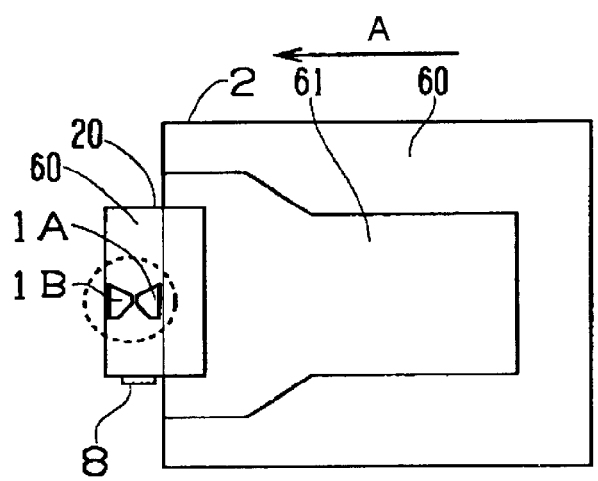
FIG. 2 is a plan view of the distal portion of the same optically-assisted magnetic recording head, taken from its medium-facing surface opposed to a recording medium.

FIG. 2 is a plan view of the distal portion of the same optically-assisted magnetic recording head, taken from its medium-facing surface opposed to a recording medium.

Figure 3:
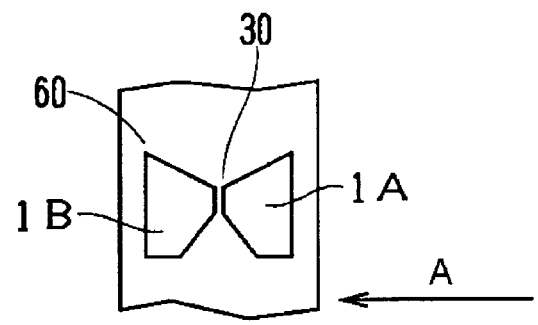
FIG. 3 is an enlarged view of a substantial part of a recording element at the distal end of the same recording head, taken from the medium-facing surface.

FIG. 3 is an enlarged view of a substantial part of a recording element at the distal end of the same recording head, taken from the medium-facing surface.

As illustrated in these figures, the optically-assisted magnetic recording head shown here includes a slider 2, a prism 7 at the distal end of the slider 2, a transparent dielectric block 20 underlying the prism 7, and a recording element 1 disposed under the block 20. A medium-facing surface 60 of the slider 2 has formed an appropriate groove 61 free from air pressure (aero pattern) for the purpose of enhancing the stability of its travel relative to the recording medium.

On the other hand, the slider 2 carved with a groove on its top, in which an optical fiber 6 is embedded. The light beam L emitted from the optical fiber 6 is reflected by the prism 7, and after passing through the transparent dielectric block 20, it is irradiated to form a light spot 31 near the gap 30 of the recording element 1. The light source (not shown) for injecting light into the optical fiber 6 may be an integral part of the recording head, or may be a separate member from the recording head, positioned inside or outside the recording apparatus.

The recording element 1 includes a pair of members (magnetic yokes) 1A, 1B opposed to each other via a gap 30. These members may be made of a soft-magnetic metallic material such as, for example, a FeTaC, FeCo, FeAlSi, CoZrNb, NiFe, CoFeNi, or other Fe, Co or Ni alloy.

The recording element 1 is magnetically coupled to a magnetic circuit 11 having a high saturated magnetic flux density and a coil (magnetic field generator) 12 (of Cu, Au, A1 or other highly conductive metal) wound on the magnetic circuit 11 and electrically insulated therefrom, and can apply a recording magnetic field from the cap 30 to a magnetic recording layer of the magnetic recording medium 200 by carrying a recording current to the coil 12. That is, the recording element 1 functions as a magnetic head for magnetically writing information on the medium. The components including the magnetic circuit 11, coil 12 and others may be made by combining a thin film-forming process such as sputtering or plating with photolithography.

On the other hand, the recording medium 200 is positioned below the slider 2 and travels relative to the slider 2 in the direction marked by arrow A. Thus, the recording magnetization 41 is written on the recording track 40 of the recording medium 200 by the recording magnetic field applied from the gap of the recording element 1.

In this embodiment, spacing and width of the gap 30 of the recording element 1 is smaller than the wavelength λ of the injected light beam L. The optical beam L irradiated to this small gap 30 induces evanescent light of a remarkably high intensity. That is, the pair of members 1A, 1B disposed at opposite sides of the gap 30 function as a bowtie type evanescent light probe with a high light-using efficiency.

Such a bowtie type evanescent light probe is disclosed in, for example, U.S. Pat. No. 5,696,372 and "High efficiency evanescent electromagnetic probe having a bowtie antenna structure", Appl. Phys. Lett., 70(11), 17, pp 1354–1356, March 1997, the entire contents of this reference being incorporated herein by reference.

That is, its mechanism is such that a light beam L injected to the gap 30 causes plasmon resonance in the members near the opposite ends of the gap 30, and thereby generates highly efficient evanescent light from the side of the medium-facing surface of the gap 30. In this case, the efficiency of use of the evanescent light obtained from the light beam L irradiated to the gap 30 reaches as high as 30%.

The Inventor could know that evanescent light with such a high intensity could use an energy beam for heating a magnetic recording medium 200, and through further developments of his own researches, has got the idea of using a "magnetic gap" for generating a recording magnetic field also as an evanescent light probe.

That is, according to the embodiment of the invention, irradiation of highly intensive evanescent light generated at the gap 30 onto the recording medium 200 makes it possible to decrease Hco of the recording medium than the recording magnetic field. Then, by applying the recording magnetic field from the gap 30 to the part decreased in Hco, optically-assisted magnetic recording can be carried out reliably.

One of basic structural features of the embodiment of the invention is to supply heating light and the magnetic field from a common side of one surface of the recording medium by using both the bowtie type evanescent light probe with a very high light-using efficiency and the magnetic recording head. More specifically, by commonly using the "gap" forming the evanescent probe also as the "magnetic gap" of the magnetic recording head, it is possible to coincide the heated region with the region applied with the recording magnetic field on the recording medium.

Determining the spacing (S) and the width (W) of the gap 30 sufficiently small than the wavelength λ of the injected light beam L (for example, when λ is 400 nm, S=20 nm and W=50 nm) enables selective heating of the region as small as tens of 10 nm, which is impossible to realize with conventional far-field light, and enables application of the magnetic field from the gap 30 just when Hco of the recoding portion has sufficiently decreased as a result of that heating. As a result, high-speed optically-assisted magnetic recording by an ultra-high density that has been impossible heretofore can be realized.

The mechanism of optically-assisted magnetic recording in the device or apparatus according to the embodiment of the invention will be next explained more concretely.

Figure 4:
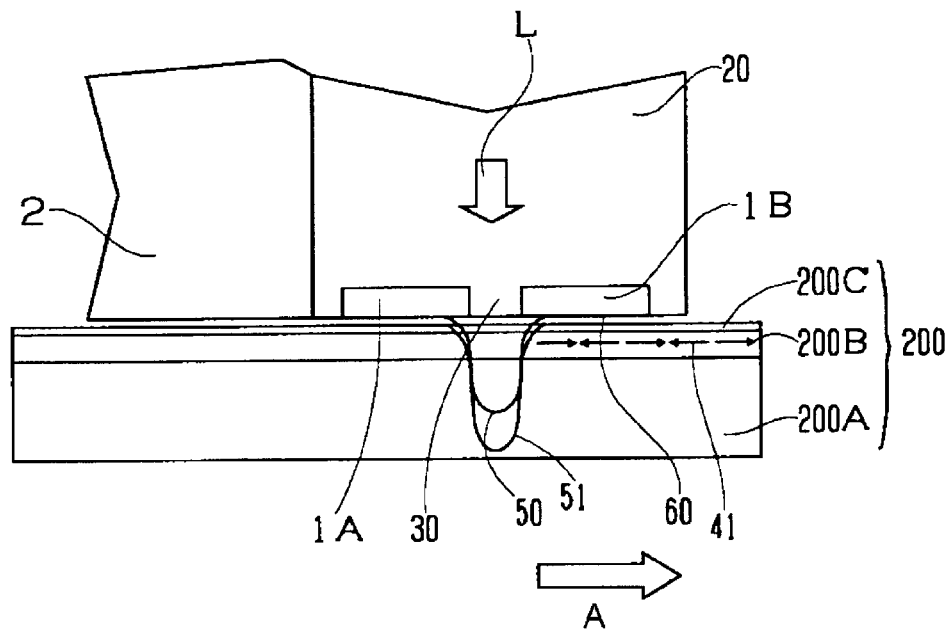
FIG. 4 is a schematic diagram for explaining a process of recording by an optically-assisted magnetic recording head according to an embodiment of the invention.

FIG. 4 is a schematic diagram for explaining a process of recording by an optically-assisted magnetic recording head according to an embodiment of the invention. That is, FIG. 4 schematically shows a medium-heating evanescent light profile 50 generated from the gap 30 of the recording element 1, and a recording magnetic field profile 51 also generated from the gap 30. Although FIGS. 1 and 4 show an example of longitudinal magnetization as the recording magnetization, the invention can be similarly realized for perpendicular magnetization.

The recording medium 200 shown here has a multi-layered structure that includes a magnetic recording layer 200B containing a magnetic material and a protective layer 200C of DLC (diamond like carbon), for example, that are stacked on a substrate 200A made of glass or polycarbonate.

The magnetic recording layer 200B may include magnetic material such as iron(Fe)-platinum(Pt) alloy system, cobalt (Co)-platinum(Pt) alloy system, or iron(Fe)-cobalt(Co)-platinum(Pt) alloy system.

As shown in FIG. 4, when a DC (direct current-like) light beam L is irradiated onto the gap 30, the evanescent light profile 50 is locally applied to the magnetic recording layer 200B of the magnetic recording medium 200 from the gap 30, and that region is heated. At that time, if a recording current is applied to the coil 12, then the recording magnetic field profile 51 is applied to the heated region of the magnetic recording layer 200B from the gap 30.

By adequately adjusting the power of the light beam L and the magnitude of the recording current applied to the coil 12, the recording magnetic field can be applied just when the coercive force Hco of the heated region sufficiently decreases, and in conjunction with subsequent rapid cooling effect, optically-assisted, stable magnetic recording is possible. In this manner, the recording magnetization 41 of a very fine size can be stably written at a high speed along the recording track 40.

The recording element 1 used in the invention is not limited to that shown in FIGS. 1 through 4.

FIGS. 5A through 5G are diagrams showing different shapes the recording element 1 according to an embodiment of the invention can take, which are plan views of their distal end portions, each taken from the medium-facing surface. In FIGS. 5A through 5G, the arrow A shows the relative traveling direction of the recording medium 200.

Examples of the recording element shown in FIGS. 5A through 5G are common in the pair of members 1A, 1B being opposed to each other via the gap, but they are different in horizontal geometry.

Figure 5A:
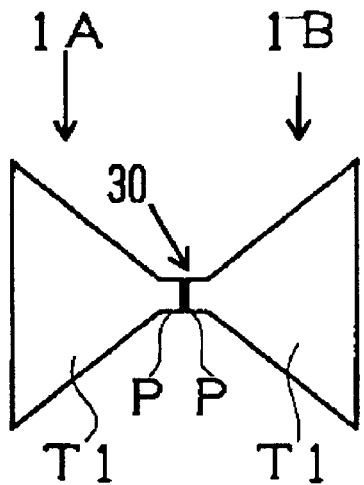

In the recoding element shown in FIG. 5A, the members 1A, 1B have projecting portions P substantially equal in width and extending substantially in parallel near the gap 30, and expanding portions T1 that gradually, linearly expand behind the projecting portions P toward their ends remotest from the gap 30. That is, narrow ends of the projecting portions P define the gap 30, and the width of the projecting portions P determines the width of the gap. By determining the gap 30 in this manner, it is possible to promote the performance of the bowtie type evanescent light probe and simultaneously prevent leakage of the recording magnetic field to the track width direction. That is, "side writing" to adjacent tracks can be prevented effectively.

Figure 5B:
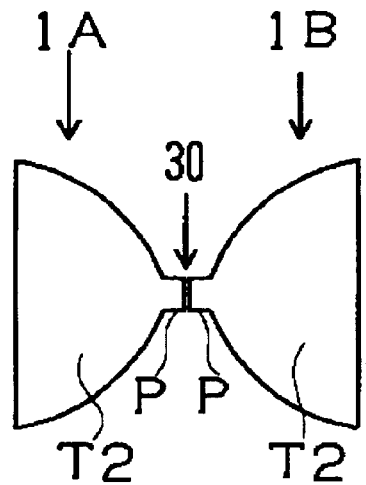

In the recording element shown in FIG. 5B, the pair of members 1A, 1B have narrowly extending projecting portions P, and expanding portions T2 extending from behind the projecting portions P while expanding in an outwardly bulging form. Here again, the projecting portions P have the same function as mentioned above.

Figure 5C:
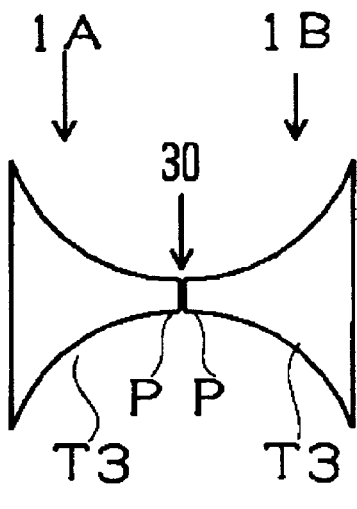

In the recording element shown in FIG. 5C, the pair of members 1A, 1B have narrowly extending projecting portions P, and expanding portions T3 that extend from behind the projecting portions P while increasing their widths in an inwardly curved form.

Figure 5D:
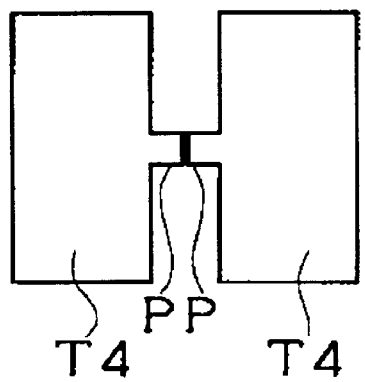

In the recording element shown in FIG. 5D, the pair of members 1A, 1B have narrowly extending projecting portions P and wide rectangular portions T4 behind the projecting portions P.

In the recording element shown in FIG. 5E, the members 1A and 1B are different in shape. The member 1A has a narrowly extending projecting portion P and a wide rectangular portion T4 behind the projecting portion P. In contrast, the member 1B has a narrow projecting portion P and an expanding portion T1 that extends from behind the projecting portion P while gradually, linearly increasing its width toward its end remotest from the gap.

In the recoding element shown in FIG. 5F, the member 1A has a narrow projecting portion P and an expanding portion T1 that extends from behind the projecting portion P while gradually, linearly increasing its width. In contrast, the member 1B has a narrowly extending projecting portion P and a wide rectangular portion T4 behind the projecting portion P.

In the recording element shown in FIG. 5G, the member 1A has a narrow projecting portion P and an expanding portion T1 that extends from behind the projecting portion P while gradually, linearly increasing its width. The member 1B, however, has no narrowly extending projecting portion, but only has a wide rectangular portion T4. That is, it is not essential that the opposed surfaces of the members at opposite sides of the gap 30 are equal in width. The shape shown in FIG. 5G is also effective because the narrow projecting portion P of the member 1A roughly determines the extension where the evanescent light is produced and the recording magnetic field is applied.

In addition to those examples, any other shape of the recoding element can be determined taking account of various parameters such as desired recording density, wavelength of light, characteristics of the magnetic recoding layer, recording conditions, configuration of the recording head, materials of respective components, and so forth.

Next explained is a cross-sectional configuration of the recording element 1.

The members 1A, 1B of the recording element 1 may have either a single-layered structure or a multi-layered structure stacking a plurality of layers.

FIG. 6 is a cross-sectional view that illustrates configuration of members 1A, 1B in form of multi-layered structures. That is, in the example shown here, the members 1A, 1B each have a multi-layered structure alternately stacking two kinds of layers M, E. Thickness of each layer and the number of layers are not limited to those illustrated. For example, a simple multi-layered structure stacking one layer E and one layer M is also acceptable.

The layer M may be a layer of a soft-magnetic material having a high saturation magnetic flux density. Examples of this material include, for example, FeAlN, FeTaC, NiFe and CoZrNb. The layer M of such material can transfer the magnetic field generated by the recoding coil 12, as already explained with reference to FIG. 1, from the magnetic circuit 11 with a high efficiency so that the magnetic field is applied from the gap 3 to the magnetic recoding medium with a high efficiency.

On the other hand, the layer E may be a layer of a material likely to bring about plasmon resonance. Examples of this material include Au, Pt, Ag and other precious metals. The layer E of such material generate plasmon resonance with the light beam L irradiated from above with a high probability, and generates evanescent light as a highly efficient probe.

That is, by employing such multi-layered structures as the members 1A, 1B, it is possible to satisfy both the efficiency of generating the recording magnetic field and the efficiency of generating the evanescent light. In addition to those illustrated, multi-layered structures stacking three or more kinds of layers in a predetermined order can yield similar effects.

Instead of multi-layered structures, single-layered structures may be also employed as the members 1A, 1B by adequately mixing a material excellent in magnetic properties and a material excellent in efficiency of generating evanescent light. For example, also by diffusing a material excellent in efficiency of generating evanescent light in a material excellent in magnetic properties, or by adequately diffusing a material excellent in magnetic properties in a material excellent in efficiency of generating evanescent light, both the efficiency of generating the recording magnetic field and the efficiency of generating the evanescent light can be satisfied simultaneously.

Next made is an explanation about the direction of the electric field vector of the light beam L irradiated to the gap 30 in this embodiment. As a result of intimate researches by the Inventors regarding generation of evanescent light via the gap 30 narrower than the wavelength λ of the incident light in the embodiments of the present invention, it has been confirmed that, upon injecting a light beam into such a narrow gap, if the direction of the electric field vector of the light beam is aligned in parallel to the direction of the spacing of the gap 30 (perpendicular to facing surfaces of the members at the gap 30), then the evanescent light can be generated with a high efficiency.

Figure 7A:
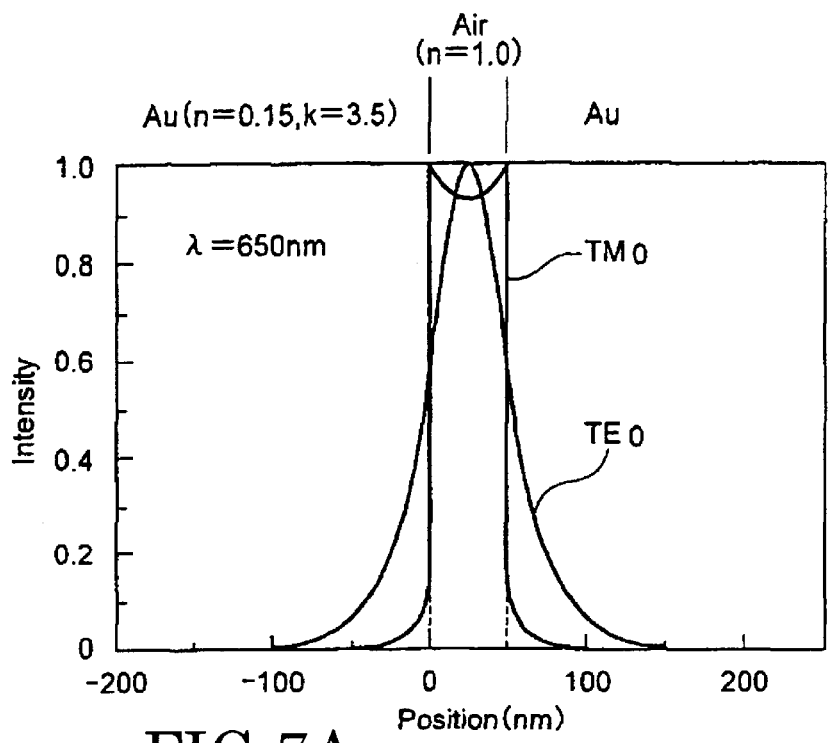
FIGS. 7A and 7B are graphs that shows a result of computation of waveguide modes of light beams in a metallic waveguide.
Figure 7B:
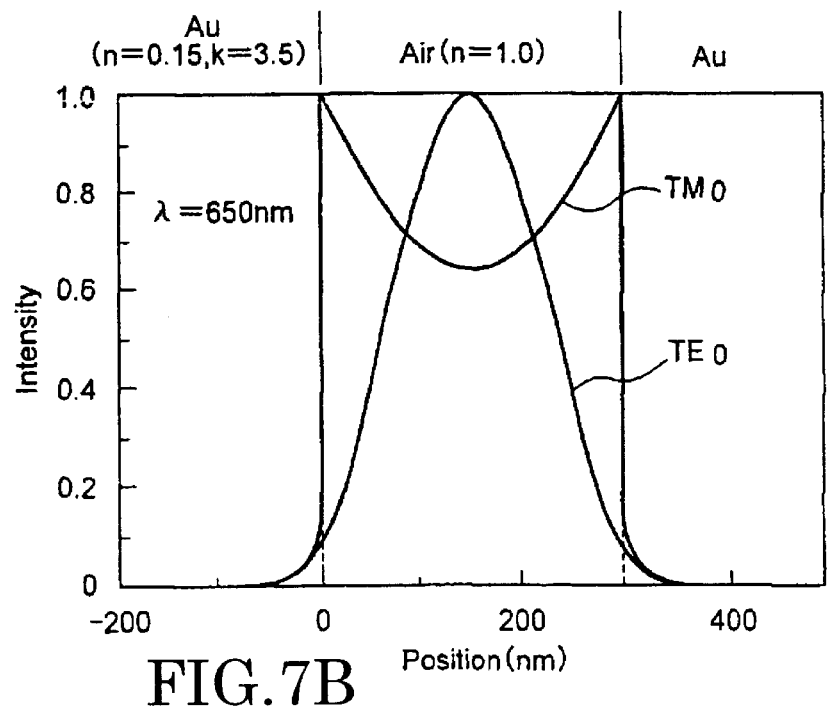

FIGS. 7A and 7B are graphs that shows a result of computation of waveguide modes of light beams in a metallic waveguide. For simplicity, waveguide modes of light whose wavelength is 650 nm in a slit-shaped opening in gold (Au) were calculated. FIG. 7A is the result of an opening relatively as small as 50 nm. FIG. 7B is the result of an opening relatively as large as 300 nm.

It will be appreciated from FIGS. 7A and 7B that the distribution profile of modes are large different between the TE (transverse electric) mode (in which the direction of the electric field vector is parallel to the boundary lines at opposite ends of the slit) and the TM (transverse magnetic) mode (in which the direction of the magnetic field vector is parallel to the boundary lines at opposite ends of the slit). The "TE mode" and the "TM mode" used here are definition with respect to the slit, and they are not oscillating modes of a laser element.

Optical intensities taken along the vertical axes of FIGS. 7A and 7B represent components of the pointing vector in the propagating direction, and discontinuity of optical intensities in the TM mode at the boundaries between air and the metal arises from discontinuity of components in the direction perpendicular to the boundary plane of the electric field vector. That is, since the quantity for continuity is the value obtained by dividing the components of the electric field vector in the direction perpendicular to the boundary planes by $n^2$ (n is the complex refractive index), the optical intensity becomes very small in the metal in which the absolute value of the real number portion of $n^2$ is large.

On the other hand, in the TE mode, since the electric vector components perpendicular to the boundary plane are 0, the coefficient of $1/n^2$ does not affect, and the electric field widely permeates into the metal.

As shown in FIG. 7B, when the spacing of the slit (opening) is relatively large, this permeation is not so large. In contrast, when the slit spacing is narrow as shown in FIG. 7A, permeation of the TE mode increases, and the ratio of permeation is largely different from that of the TM mode. The permeated part into the metal suffers a large absorption loss, and the waveguide mode becomes a mode having a large loss. In the TM mode, however, even when the slit width is small, since the permeation into the metal is small because of the above-mentioned reason, the loss of the waveguide mode is very small.

That is, in case the spacing of the gap 30 is reduced as small as tens of nanometers, by injecting the light beam in the TM mode, i.e. by orienting the electric field vector in parallel to the spacing direction (shown by the arrow A in FIG. 5G) of the gap 30, it is possible to greatly reduce the loss of light caused by permeation into the members 1A, 1B and produce evanescent light with a higher efficiency.

Some results of computation by the Inventors are shown below.

Figure 8:
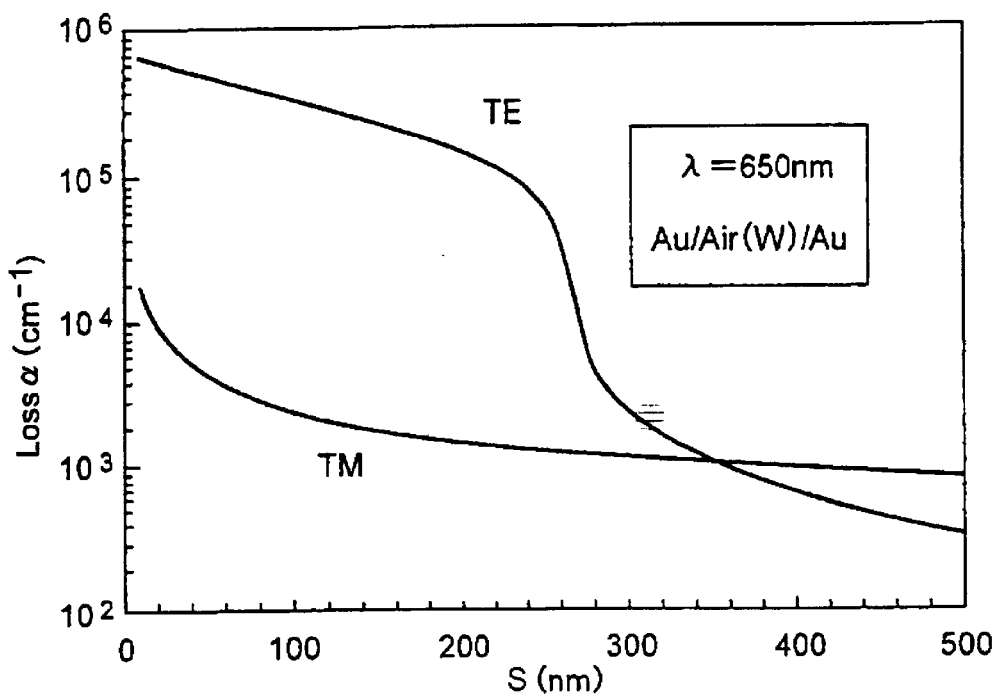
FIG. 8 is a graph that shows a relation between the spacing S of a gap 30 and the waveguide mode loss α, which is established when the yokes 1A, 1B are made of Au.

FIG. 8 is a graph that shows a relation between the spacing S of a gap 30 and the waveguide mode loss α, which is established when the members 1A, 1B are made of Au. Wavelength of the incident light beam used here is 650 nm. It will be appreciated from FIG. 8 that the loss of the TM mode becomes lower by two digits than the TE mode as the gap spacing S decreases. That is, it is quantitatively demonstrated that, in case of a narrow gap, the loss is greatly reduced when light is injected in the TM mode, i.e. such that the electric field vector is in parallel to the spacing direction of the gap.

In a specific example in which the members 1A, 1B are made of 100 nm thick Au via the gap 30 with the spacing of 50 nm, transmittance is as follows in FIG. 8.

| | |
|---|---|
| In the region other than the gap 30: | 0.001 |
| Transmittance in the TE mode: | 0.006 |
| Transmittance in the TM mode: | 0.956 |

Therefore, the light sufficiently attenuates in the structures of this thickness, and can path through the gap 30 in the TM mode with substantially no loss. On the other hand, in the TE mode, the light does not path through the gap 30 almost at all. It is appreciated from FIG. 8 that the loss can be reduced only when the gap spacing is 260 nm or more.

Figure 9:
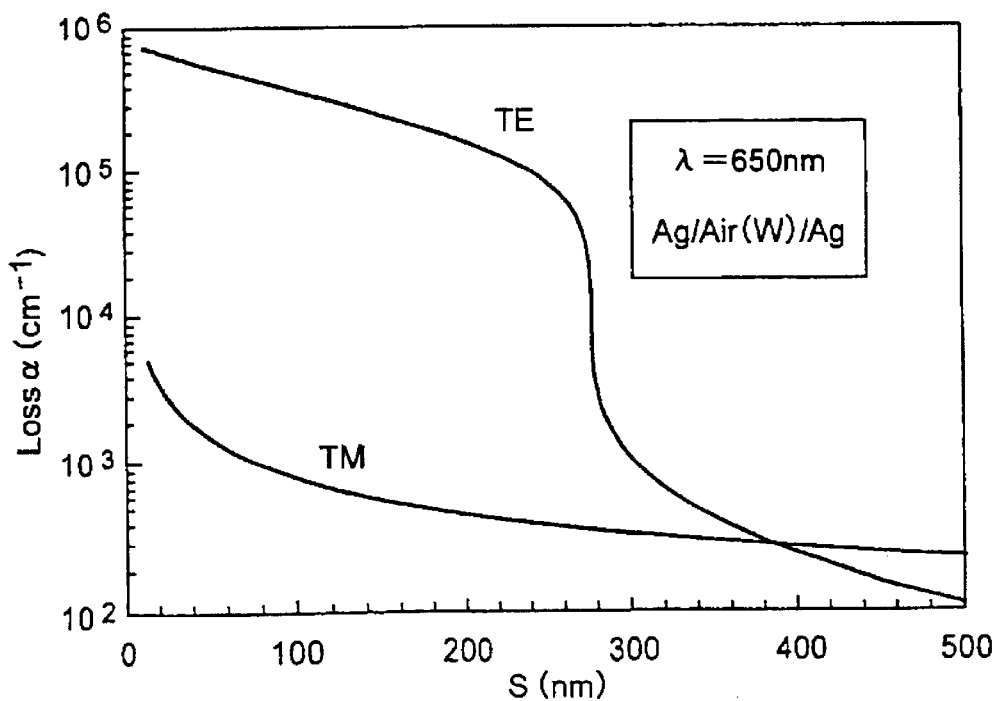
FIG. 9 is a graph that shows a result of computation of losses of TE and TM modes, respectively, which are produced when the yokes 1A, 1B are made of Ag.

FIG. 9 is a graph that shows a result of computation of losses of TE and TM modes, respectively, which are produced when the members 1A, 1B are made of Ag. Here again, the loss is smaller in the TM mode than in the TE mode, and when the gap spacing S is smaller than 100 nm, there is produced a difference of loss by two digits or more between those modes.

Figure 10:
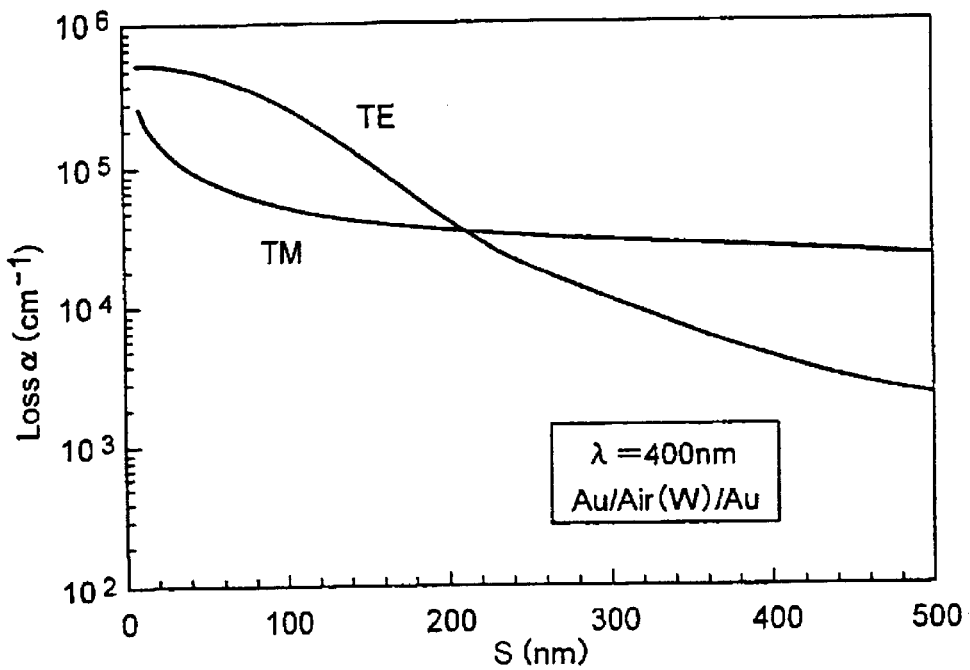
FIG. 10 is a graph that quantitatively shows losses of respective modes of light having the wavelength of 400 nanometer in gold structures.
Figure 11:
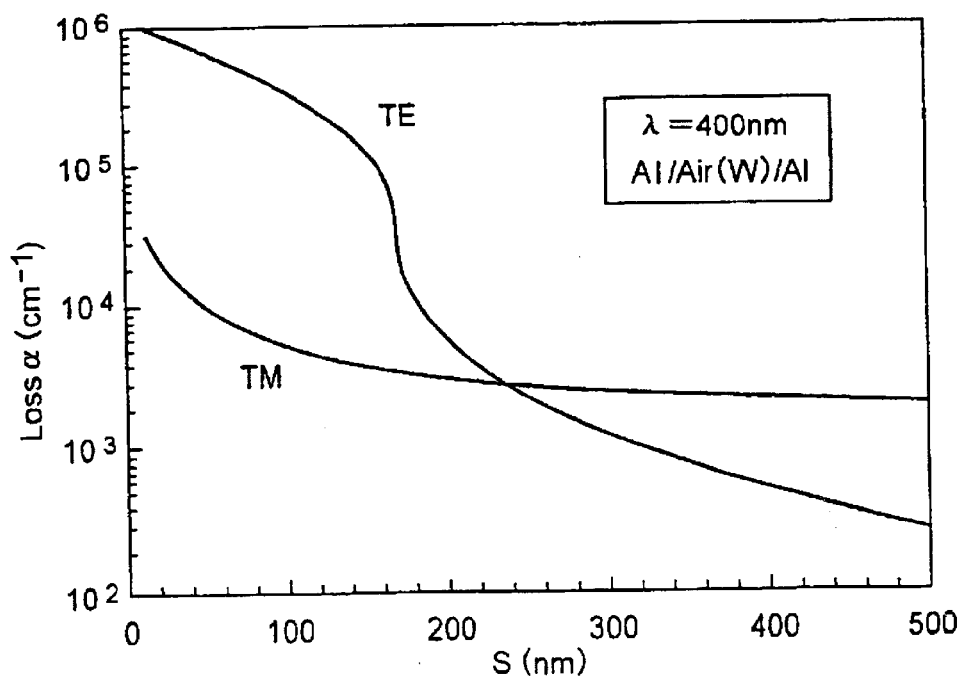
FIG. 11 is a graph that quantitatively shows losses of respective modes of light having the wavelength of 400 nanometer in aluminum structures.

FIGS. 10 and 11 are graphs that quantitatively show losses of respective modes of light having the wavelength of 400 nm in gold and aluminum structures. It is appreciated from these graphs that a large loss difference is produced between those modes even with the short wavelength of 400 nm if the gap spacing S is smaller than 100 nm.

As explained above, in case the spacing S of the gap 30 is around 10 nm shorter than the wavelength of the injected light beam, by orienting the polarization direction of the injected light in parallel to the spacing of the gap 30, evanescent light can be obtained with a high efficiency and a very small loss.

Heretofore, configuration and principle of operation of the essential part of the optically-assisted magnetic recording head according to an embodiment of the invention have been explained.

Next made is an explanation of the entire configuration by way of specific examples with reference to the drawings.

Figure 12:
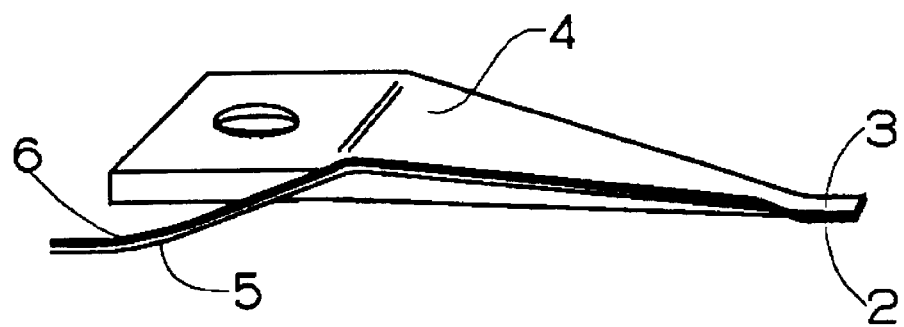
FIG. 12 is a perspective view that illustrates how a slider 2 illustrated in FIGS. 1 through 4 is mounted via a head suspension 4 and a gimbal spring 3.

FIG. 12 is a perspective view that illustrates how a slider 2 illustrated in FIGS. 1 through 4 is mounted via a head suspension 4 and a gimbal spring 3. The head suspension 4 of this type is fixed to, for example, a rotary actuator head arm of a magnetic disk apparatus explained later. The head slider 2 is a member that travels relative to a magnetic recording medium like a magnetic disk floating above or in contact with it.

Figure 13:
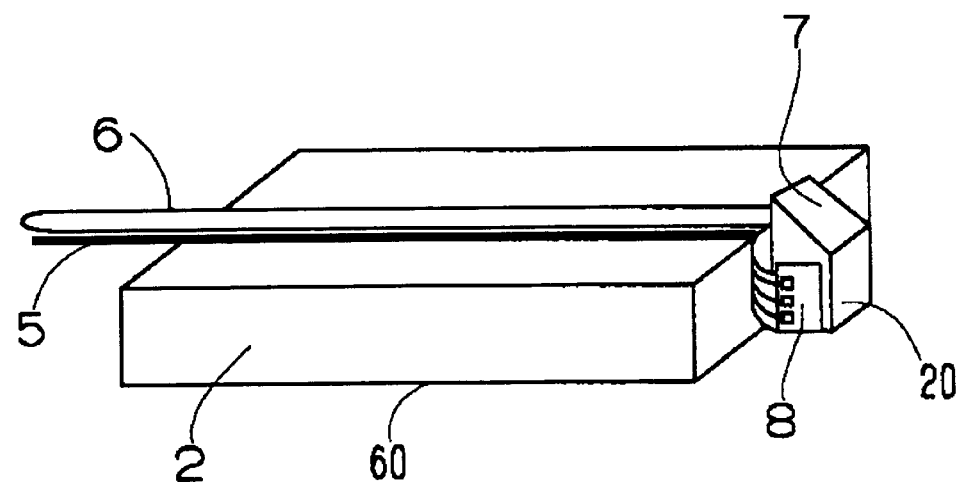
FIG. 13 is a perspective view of the entire head slider 2.

FIG. 13 is a perspective view of the entire head slider 2, and a recording medium (not shown) is placed under the head slider 2. The slider 2 carries the prism 7 and the transparent dielectric block 20 on its tail end (where the medium runs out). The recording element 1 (not shown here) is positioned adjacent to the medium-facing surface 60 of the transparent dielectric block 20, an electrode pad 8 for connection with a lead wire of the recording element 1 is provided on a lateral surface of the transparent dielectric block 20. Then, a lead wire 5 is provided to extend from the electrode pad 8 along the top face of the head slider 2. A lead from the coil 12 is also connected to the electrode pad 8.

Figure 14:
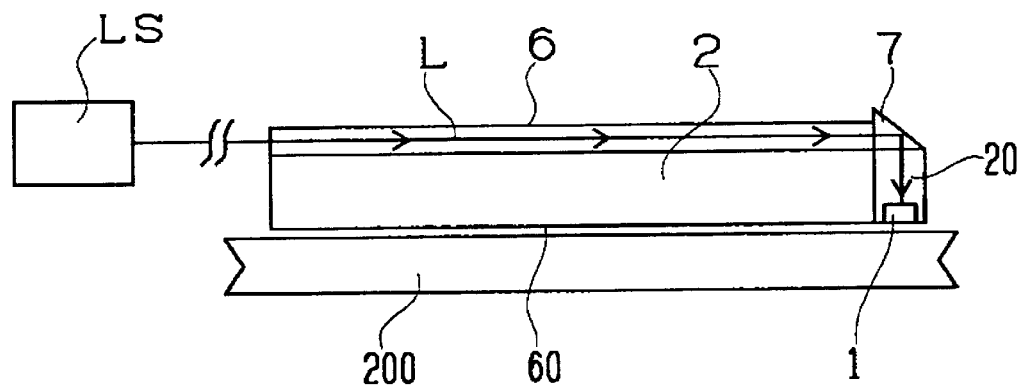
FIG. 14 is a cross-sectional view that shows a propagation path for alight beam L of the wavelength λ introduced onto the recording element 1.

FIG. 14 is a cross-sectional view that shows a propagation path for a light beam L of the wavelength λ introduced onto the recording element 1. That is, in case of the configuration shown here, the light beam L is supplied from the light source LS via the fiber 6, then reflected by the prism 7, transmitted through the transparent dielectric block 20 and injected to the recording element 1. In case the light beam L is supplied from the fiber 6 in this manner, the light source LS may be placed on the recording head, or may be provided as a separate member from the recording head inside or outside the recording apparatus. It results in the advantage that any light source LS which is difficult to integrate at the distal end of the head can be used as well. For example, a large-scale laser source for large output power or a tubular laser can be used as the light source LS.

Figure 15:
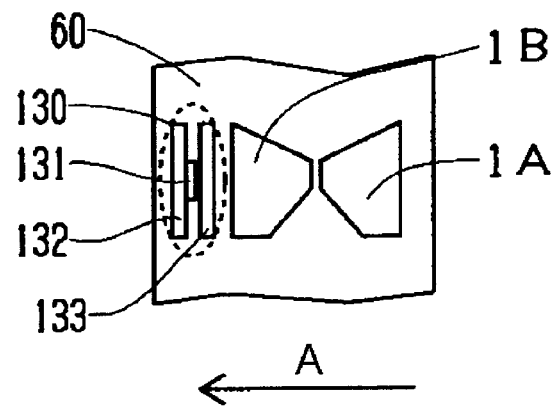
FIG. 15 is a plan view that shows the substantial part of a head additionally having a magnetic reproducing element.

FIG. 15 is a plan view that shows the substantial part of a head additionally having a magnetic reproducing element. This is a schematic view showing the horizontal geometry of the slider 2, taken from its medium-facing surface. At the downstream side of the medium traveling direction A as viewed from the recording element 1, a shield-type magnetic reproducing element 13 is provided. The magnetic reproducing element 130 is made up of a magnetic detector element 131 sandwiched between a pair of shield layers 132, 133 to detect a reproducing magnetic field generated from the recording magnetization 41 on the recording track 40 written on the magnetic recording medium 200 with a high sensitivity and a high resolution and thereby to reproduce the recording signal. The reproducing element 130 can be made by using, for example, a magneto resistance effect element such as GMR (giant magneto resistance effect) element, AMR (anisotropic magneto resistance effect) element, or TMR (tunneling magneto resistance effect). This kind of shield-type magnetic reproducing element 130 can be manufactured by using the same process as used for forming the recording element 1.

Next explained is the second example of the optically-assisted magnetic recording head according to the embodiment of the invention.

Figure 16:
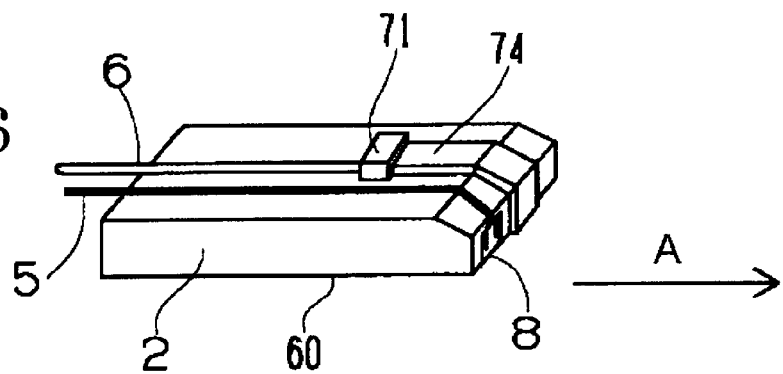
FIG. 16 is a perspective view of the substantial part of an optically-assisted magnetic recording head taken as the second example of the invention.

FIG. 16 is a perspective view of the substantial part of an optically-assisted magnetic recording head taken as the second example of the invention.

Figure 17:
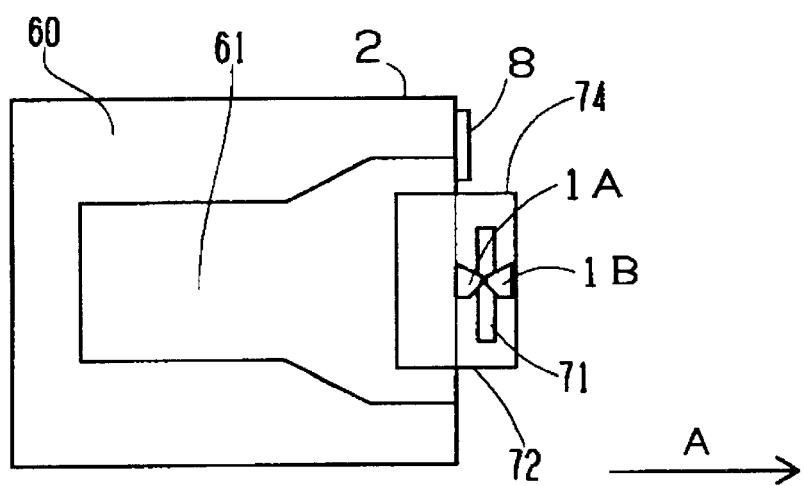
FIG. 17 is a plan view of the recording head as the second example, taken from its medium-facing surface.

FIG. 17 is a plan view of the recording head as the second example, taken from its medium-facing surface. In these figures, common or equivalent elements or components to those already explained with reference to FIGS. 1 through 15 are labeled with common reference numerals, and their detailed explanation is omitted. The recording medium (not shown) travels relative to the slider 2 in the direction marked by arrow A.

In this specific example, the light beam L traveling through the optical fiber 6 is introduced to one end of a thin-film optical waveguide 74 via an optical coupler 70, and the light beam L guided through the waveguide 74 is irradiated onto the gap 30 of the recording element 1. The waveguide 74 has a core 71 and a clad 72 surrounding it. The waveguide 74 of this type can be made by combining a thin film-forming process and photolithography and by using the same kinds of processes as used for the recording element 1, magnetic circuit 11 and other elements not shown here, such as magnetic circuit 11, coil, magnetic reproducing element 130, and so forth.

According to the specific example shown here, since the thin film light waveguide 74 can be miniaturized while maintaining its low loss property by using a relatively simple process, it is possible to minimize the loss of the light beam L released from the fiber 6 and concentrate its power to the gap 30. As a result, the medium heating efficiency can be improved further.

Next explained is the third specific example of the optically-assisted magnetic recording head according to the embodiment of the invention.

Figure 18A:
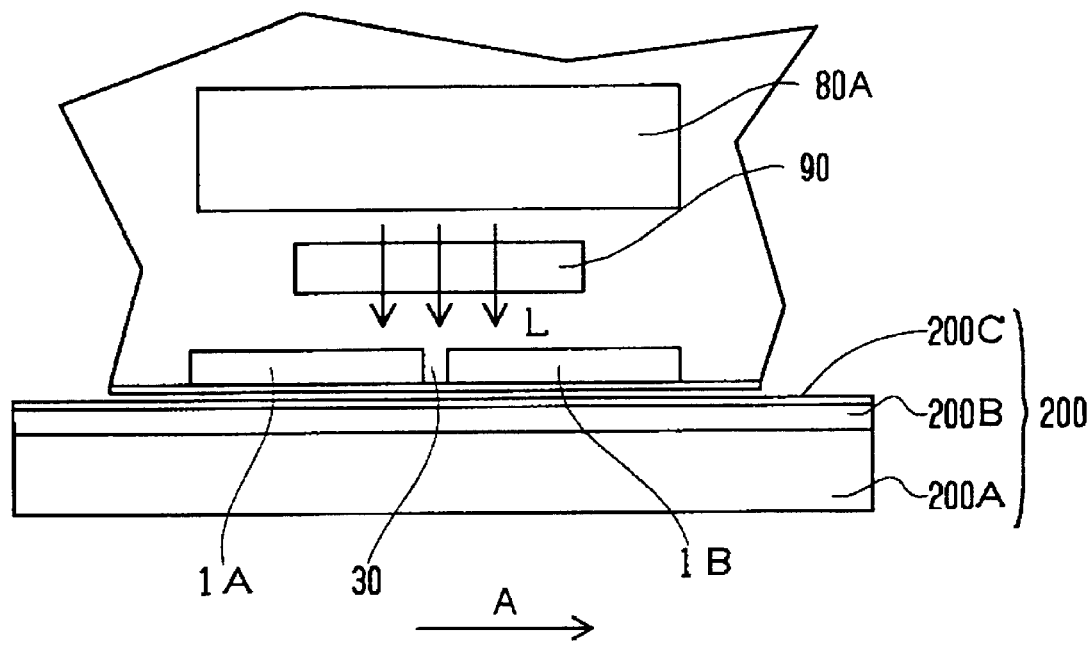
FIG. 18A is a cross-sectional view of the substantial part of an optically-assisted magnetic recording head taken as the third example of the invention.

FIG. 18A is a cross-sectional view of the substantial part of an optically-assisted magnetic recording head taken as the third example of the invention.

Figure 18B:
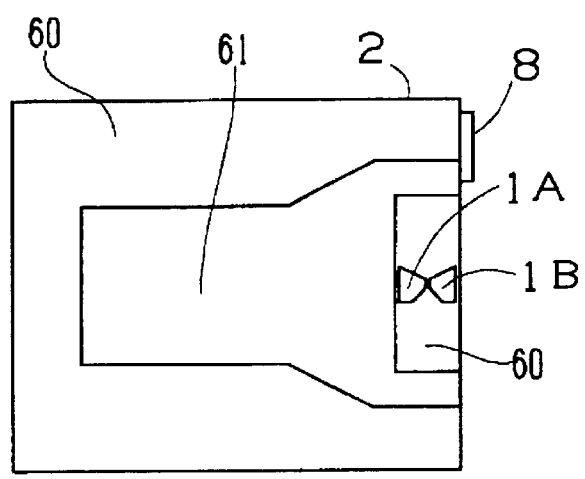
FIG. 18B is a plan view of the recording head as the third embodiment, taken from its medium-facing surface.

FIG. 18B is a plan view of the recording head as the third embodiment, taken from its medium-facing surface. Here again, common or equivalent elements or components to those already explained with reference to FIGS. 1 through 17 are labeled with common reference numerals, and their detailed explanation is omitted.

In this example, a laser element 80A is provided as the light source of the light beam on the head slider 2. The laser element 80A is a surface emission type light-emitting element such as vertical cavity surface-emitting laser (VCSEL). The light beam L emitted from the emission surface of the laser element 80A is irradiated onto the gap 30 of the recording element 1 via an optical means 90 such as a lens, if necessary.

The specific example shown here makes it possible to integrate the laser element as the light source, the recording element 1 and also the magnetic recording element, not shown, inside the head slider 2.

For example, these components can be made by cumulating them vertically of the medium-facing surface of the head slider 2 by using a thin film-forming technique and photolithography. This configuration produces the same effects as those of the foregoing specific examples.

Additionally, by incorporating the laser element 80A as the light source, recording element 1 and the magnetic reproducing element, not shown, into an integral body, it is possible to realize a compact, lightweight and highly reliable optically-assisted magnetic recording head, enable a high-speed seeking operation and decrease the cost of the head and the drive.

Figure 19A:
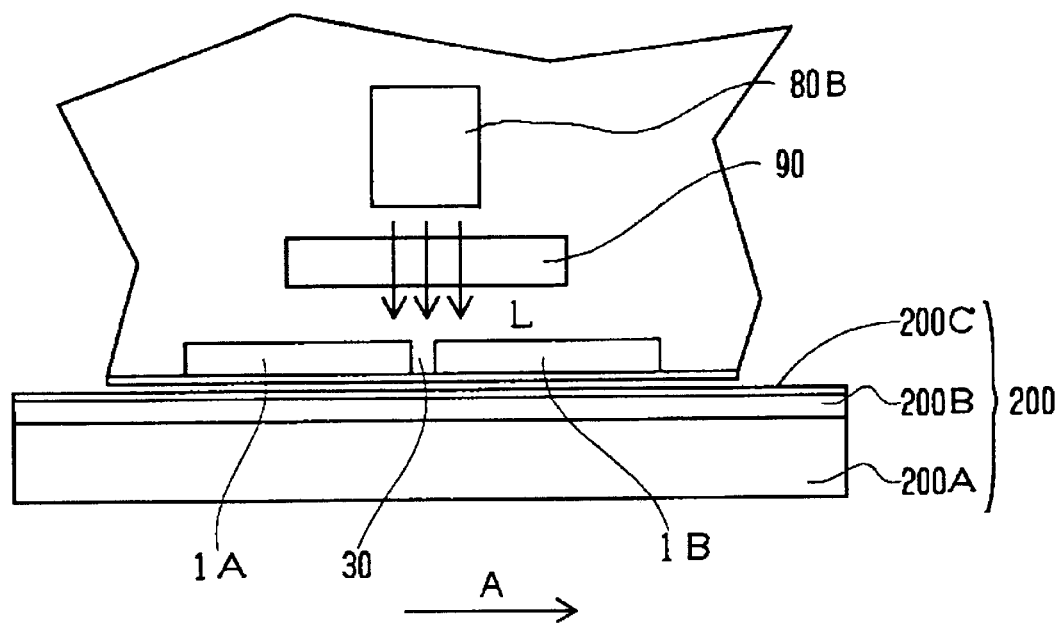
FIG. 19A is a cross-sectional view of the substantial part of an optically-assisted magnetic recording head taken as the fourth example of the invention.

FIG. 19A is a cross-sectional view of the substantial part of an optically-assisted magnetic recording head taken as the fourth example of the invention.

Figure 19B:
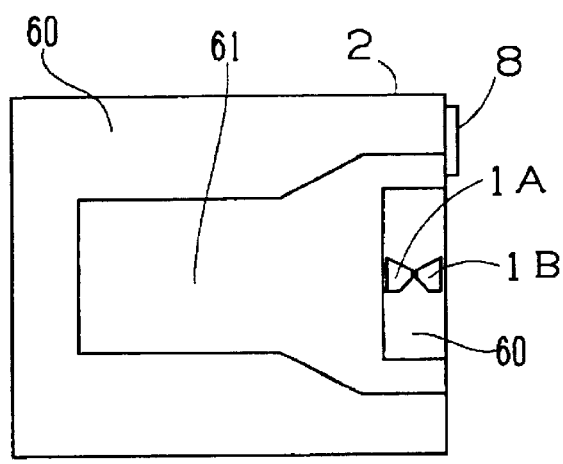
FIG. 19B is a plan view of the recording head as the fourth embodiment, taken from its medium-facing surface.

FIG. 19B is a plan view of the recording head as the fourth embodiment, taken from its medium-facing surface. Here again, common or equivalent elements or components to those already explained with reference to FIGS. 1 through 18B are labeled with common reference numerals, and their detailed explanation is omitted.

The head according to this specific example is similar in construction to the third specific example. However, here is used an edge-emitting type laser element 80B. Even by using the edge-emitting type laser element 80B, highly efficient evanescent light can be easily generated.

Although explanation has been omitted from the description about the foregoing specific examples with reference to FIGS. 1 through 19B, from the viewpoint of preventing mutual abrasion and crushing of the magnetic recording medium 200 and the head slider 2, which may occur while the head slider 2 moves relative to the magnetic recording medium 200, floating above or in contact with it, a protective film (such as a carbon film) as thin as 10 nm or less is preferably formed on the medium-facing surface of the head slider 2 (including the surface of the recording element 1 as well) by sputtering or CVD, for example.

Next explained is a optically-assisted magnetic recording apparatus according to the embodiment of the invention. The optically-assisted magnetic head according to the embodiments of the invention, as explained with reference to FIGS. 1 through 19B, can be incorporated as a magnetic head assembly of a recording/reproducing integral type, for example, and can be mounted in a optically-assisted magnetic recording apparatus.

Figure 20:
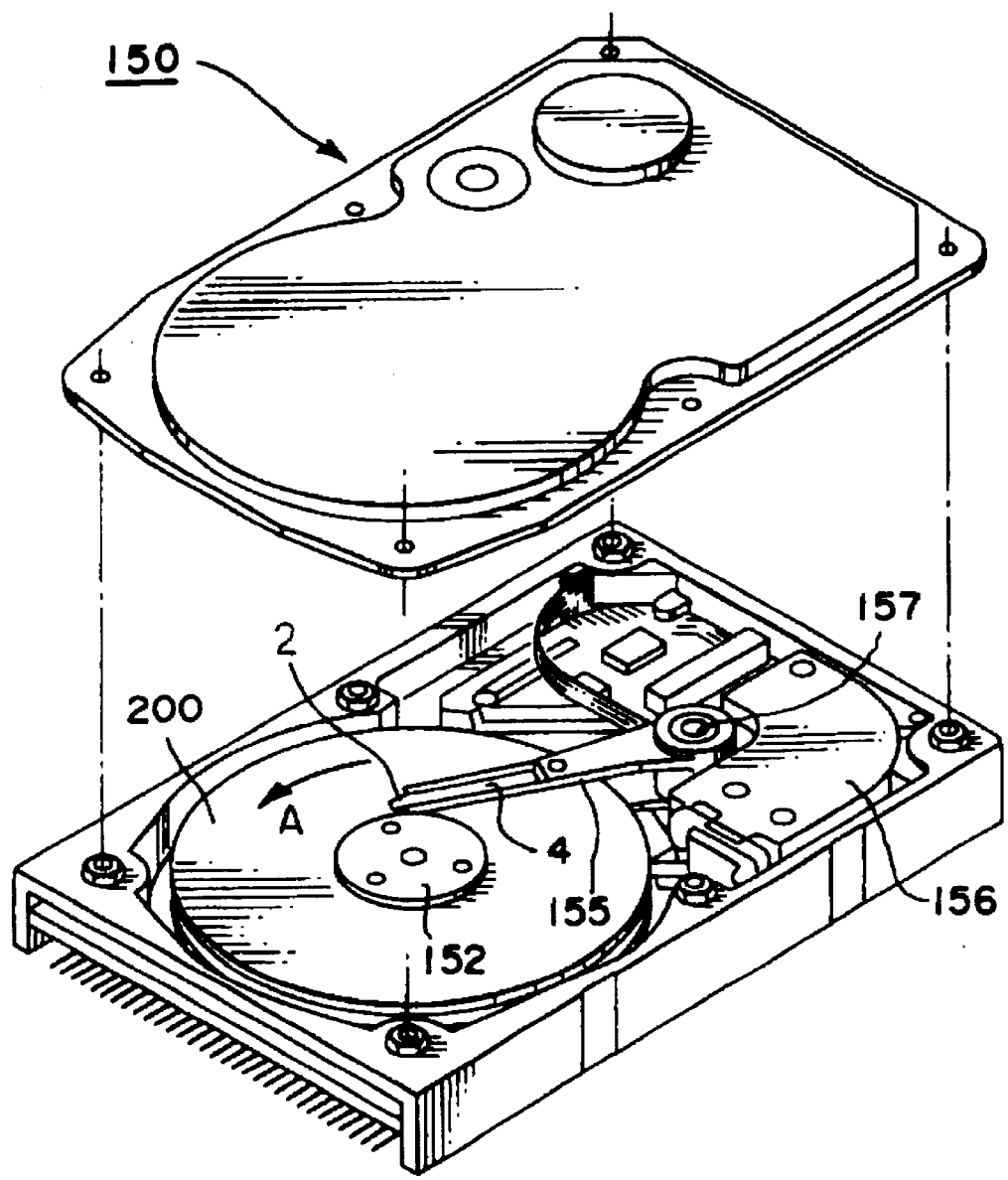
FIG. 20 is a perspective view that schematically shows a configuration of a major part of a magnetic recording/reproducing apparatus according to the embodiments of the invention.

FIG. 20 is a perspective view that schematically shows a configuration of a major part of a magnetic recording/reproducing apparatus according to the embodiment of the invention. The magnetic recording/reproducing apparatus 150 according to the embodiment is an apparatus of a type using a rotary actuator. In FIG. 20, a recording magnetic disk 200 is mounted on a spindle 152 and rotated in the arrow A direction by a motor, not shown, which is responsive to a control signal from a drive device controller, not shown. The optically-assisted magnetic recording apparatus according to the embodiment of the invention may also include a plurality of recording magnetic disks 200.

A head slider 2 executed recording or reproduction of information to be stored in the magnetic disk 200 is attached to the tip of a thin-film suspension 4. The head slider 2 includes the optically-assisted magnetic head according to the foregoing embodiment near its tip.

When the magnetic disk 200 rotates, the medium-facing surface (ABS) of the head slider 2 is held with a predetermined floating height from the surface of the magnetic disk 200. Alternatively, the apparatus may employ a contact-type configuration where the slider 2 is in contact with the disk 200 during the operation.

The suspension 4 is connected to one end of an actuator arm 155 that has a bobbin portion for holding a drive coil, not shown. At the other end of the actuator arm 155, a voice coil motor 156, which is a kind of linear motor, is provided. The voice coil motor 156 is composed of a drive coil, not shown, wound up on the bobbin portion of the actuator arm 155, and a magnetic circuit made up of a permanent magnet and an opposed yoke disposed in confrontation so as to sandwich the drive coil.

The actuator arm 155 is held by ball bearings, not shown, which are provided upper and lower two positions of a rigid shaft 157 for free rotational and slidable movements with a driving force from the voice coil motor 156.

Figure 21:
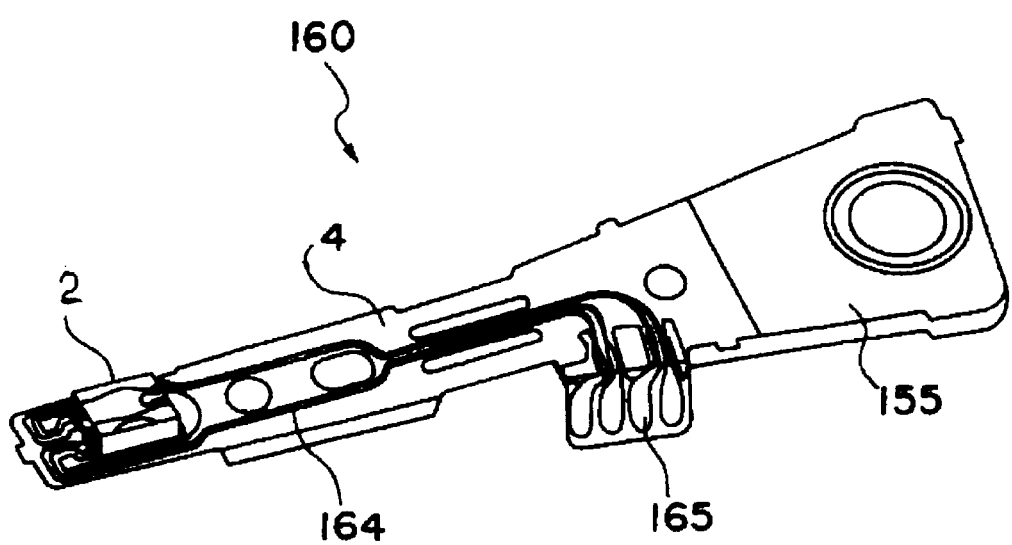
FIG. 21 is an enlarged, perspective view of the magnetic head assembly from the actuator arm 155 to its distal end, taken from the disk side.

FIG. 21 is an enlarged, perspective view of the magnetic head assembly from the actuator arm 155 to its distal end, taken from the disk side. The magnetic head assembly 160 includes the actuator arm 155 having the bobbin portion for holding the drive coil, for example, and the suspension 4 is connected to one end of the actuator arm 155.

At the extremity of the suspension 4, the head slider 2 incorporating the optically-assisted magnetic head already explained with reference to FIGS. 1 through 19B is attached.

A reproducing element may be combined with it. The suspension 4 has a lead line 164 for writing and reading signals, and the lead line 164 and electrodes of the magnetic head incorporated in the head slider 2 are electrically connected. Numeral 165 denotes an electrode pad of the magnetic head assembly 160.

Figure 22:
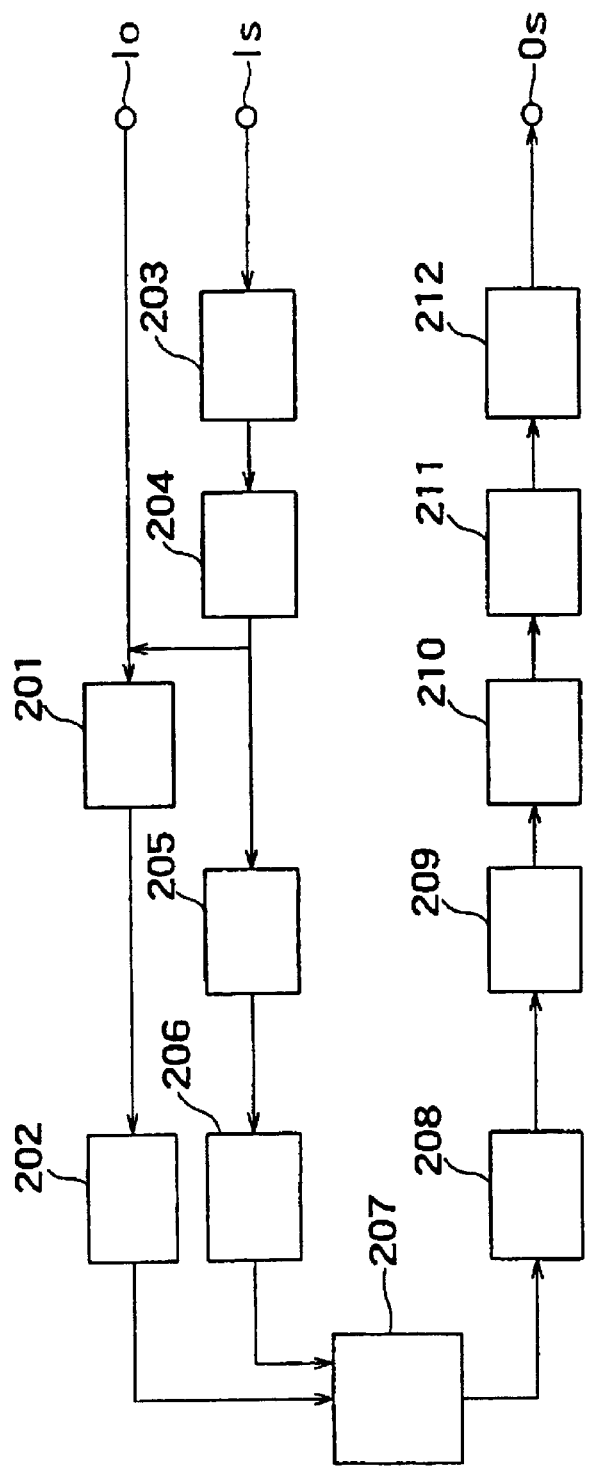
FIG. 22 is a block diagram that shows the thermally-assisted magnetic recorder according to the embodiment of the invention.

FIG. 22 is a block diagram that shows the thermally-assisted magnetic recorder according to the embodiment of the invention. In FIG. 22, the reference Io denotes a drive input of a light emitting element, Is a signal input, Os a signal output, 201 a drive circuit system of the light emitting element, 202 a light emitting element, 203 a ECC (error correction code) append circuit, 204 a modulation circuit, 205 a record correction circuit, 206 a recording element built in the head, 207 a medium, 208 a reproducing element built in the head, 209 an equivalent circuit, 210 a decoding circuit, 211 a demodulation circuit, and 212 an ECC circuit.

The thermally-assisted magnetic recorder according to this model can be characterized by the addition of, for example, the light emitting element drive input Io, a drive circuit system of the light emitting element 201 and light emitting element 202, the novel head construction as previously described concerning the aforementioned embodiments including an evanescent light probe, and recording magnetic head, and the specially adjusted controlling system in order to perform the optically-assisted magnetic recording successfully to the mangnetic recording medium.

To drive the light emitting element, a DC voltage may be applied to the laser element or the light emitting element without any feedback-loop system. Alternatively, the light emitting element may be driven in a pulsed manner synchronously with an output from the modulation circuit. The pulsed drive will make more complicate the circuit configuration, but it is preferable for a longer service life of the laser. The ECC append circuit 203 and ECC circuit 212 need not be provided. The modulation and demodulation method, and record correcting method may freely be selected.

Information is input to the medium by directing the evanescent light caused by the light emitting element 202 to the medium and applying a recording magnetic field derived by modulating a recording signal from the recording element 206 to a position on the medium where Hc0 has been lowered due to the irradiation of the evanescent light. Forming of information to be written as a magnetic transition train on the medium surface is the same as in the conventional magnetic recorder.

A magnetic field developed from the magnetic transition train and coming from the medium is detected as a signal field by the reproducing element 208. The reproducing element may include a detecting element which may be typically of GMR type. But the detecting element may be of the ordinary AMR (anisotropic magnetoresistance effect) type. In future, a TMR (tunneling magnetoresistance effect) type may be employed.

The optically-assisted magnetic recording apparatus according to the embodiments of the invention, as shown in FIGS. 20 through 22, can greatly improve the recording density as compared with conventional systems, and can simultaneously improve the stability and reliability of reproduced signals.

Heretofore, some embodiments of the invention have been explained. The invention, however, is not limited to these specific examples. For example, regarding the entire configuration of the head and shapes and materials of the prism, fiber and other optical elements, and other components such as the magnetic shield, coil, magnetic circuit and light source, any person skilled in the art will be able to select appropriate equivalents from known designs and materials, to obtain equivalent effects.

It will be also appreciated that the invention is applicable not only to optically-assisted magnetic heads or magnetic recording apparatuses of the longitudinal recording type but also to those of the perpendicular magnetic recording type and ensures substantially the same effects.

It will be also appreciated that the invention can employ a magnetic optical disk (MO disk).

The optically-assisted magnetic recording apparatus according to the embodiment of the invention may be of a so-called stationary type incorporating a particular recording medium in a stationary fashion, or of a so-called "removable" type permitting recording mediums to be loaded and unloaded.

The embodiment of the invention involves all optically-assisted magnetic recording heads and optically-assisted magnetic recording apparatuses that any skilled in the art will be able to bring into practical use by appropriately modifying the design on the basis of the magnetic heads and magnetic recording apparatuses explained above as specific embodiments or examples of the invention.

According to the embodiments of the invention, it is possible to endow a low-noise, multiparticle medium having a very small grain size necessary for high-density recording and reproduction with sufficiently high resistance to thermal agitation around the room temperature, and it is also possible to realize high-speed recording using a practical recording head by reducing the magnetic field required for magnetic reversal of the medium by irradiation of intensive evanescent light at the region for application of the recording magnetic field.

Additionally, since the embodiments of the invention permit that both the region to be heated and the region to be applied with the recording magnetic field are cumulated vertically on the magnetic recording medium such that the high-efficiency evanescent light probe is commonly used as the recording magnetic element, heating of the medium and application of the recording medium to the medium can be carried out at the best timings for the benefit of high-density recording, and it results in ensuring high-efficiency optically-assisted magnetic recording.

Furthermore, according to the embodiments of the invention, it is possible to provide a compact, lightweight and highly reliable optically-assisted magnetic recording head can be provided and thereby realize a high-speed seeking operation and decrease the cost of the head and the drive.

As described above, the embodiments of the invention ensure stable magnetic recording of much higher recording density than those of conventional techniques at a high speed. Thus the industrial advantages of the invention are great and remarkable.

While the present invention has been disclosed in terms of the embodiments in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optically-assisted magnetic recording head to record information magnetically on a medium comprising:
   a pair of magnetic yokes having a gap therebetween, irradiation of light onto one side of the gap generating an evanescent light on another side of the gap;
   a magnetic field generator applying a magneto-motive force to the magnetic yokes to build a recording magnetic field across the gap; and
   an irradiator to irradiate the light onto the one side of the gap,
   the information being recorded by the recording magnetic field on the medium which is heated by irradiation of the evanescent light thereto,
   wherein the light irradiated from the irradiator has a wavelength longer than a distance between the yokes at the gap,
   at least one of the yokes has a narrow projecting portion, and the gap is formed between the distal end of the projecting portion of the one of the yokes and another one of the yokes, and
   the projecting portion has a width shorter than a wavelength of the light irradiated by the irradiator.

2. The optically-assisted magnetic recording head according to claim 1, wherein the yokes contain a soft magnetic material.

3. The optically-assisted magnetic recording head according to claim 1, wherein the yokes are so configured that irradiation of the light to onto the gap causes plasmon resonance therein and responsively generates the evanescent light at the gap.

4. The optically-assisted magnetic recording head according to claim 1, wherein the yokes are made of stacking a layer containing a soft-magnetic material as a major component thereof and a layer containing a precious metal as a major component thereof.

5. The optically-assisted magnetic recording head according to claim 1, wherein the light irradiated onto the gap has an electric field vector substantially perpendicular to facing surfaces of the yokes at the gap.

6. The optically-assisted magnetic recording head according to claim 1, wherein the irradiator includes a waveguide part to guide a light supplied from a light source located outside the optically-assisted magnetic recording head.

7. The optically-assisted magnetic recording head according to claim 1, wherein the irradiator includes a laser element.

8. An optically-assisted magnetic recording apparatus to record information magnetically on a medium comprising:
   a pair of magnetic yokes having a gap therebetween; and
   an irradiator to irradiate a light onto the gap,
   a recording magnetic field being formed across the gap,
   information being recorded by the recording magnetic field on the medium which is heated by irradiation of an evanescent light which is formed on one side of the gap by irradiation of the light onto another side of the gap,
   wherein the light irradiated from the irradiator has a wavelength longer than a distance between the yokes at the gap,
   at least one of the yokes has a narrow projecting portion, and the gap is formed between the distal end of the projecting portion of the one of the yokes and another one of the yokes, and
   the projecting portion has a width shorter than a wavelength of the light irradiated by the irradiator.

9. An optically-assisted magnetic recording apparatus to record information magnetically on a medium comprising:

an irradiator to irradiate a light onto a gap;

a magnetic field generator;

a pair of magnetic yokes having a gap therebetween, an evanescent light being generated at one side of the gap by the irradiation of the light by the irradiator onto another side of the gap, and a recording magnetic field being formed across the gap by applying a magnetic field from the magnetic field generator to the yokes; and a transfer mechanism to move the medium relative to the gap, information being recorded by the recording magnetic field on the medium which is heated by irradiation of the evanescent light thereto while the medium is moved by the transfer mechanism, wherein the light irradiated from the irradiator has a wavelength longer than a distance between the yokes at the gap, at least one of the yokes has a narrow projecting portion, and the gap is formed between the distal end of the projecting portion of the one of the yokes and another one of the yokes, and the projecting portion has a width shorter than a wavelength of the light irradiated by the irradiator.

10. The optically-assisted magnetic recording apparatus according to claim 9, wherein the yokes contain a soft magnetic material.

11. The optically-assisted magnetic recording apparatus according to claim 9, wherein the yokes are so configured that irradiation of the light to onto the gap causes plasmon resonance therein and responsively generates the evanescent light at the gap.

12. The optically-assisted magnetic recording apparatus according to claim 9, wherein the yokes are made of stacking a layer containing a soft-magnetic material as a major component thereof and a layer containing a precious metal as a major component thereof.

13. The optically-assisted magnetic recording apparatus according to claim 9, wherein the light irradiated onto the gap has an electric field vector substantially perpendicular to facing surfaces of the yokes at the gap.

* * * * *